April 9, 1946.　　　　C. G. BAILEY　　　　2,398,129
PIE PAN LIFTER
Filed May 2, 1945　　　　2 Sheets-Sheet 2
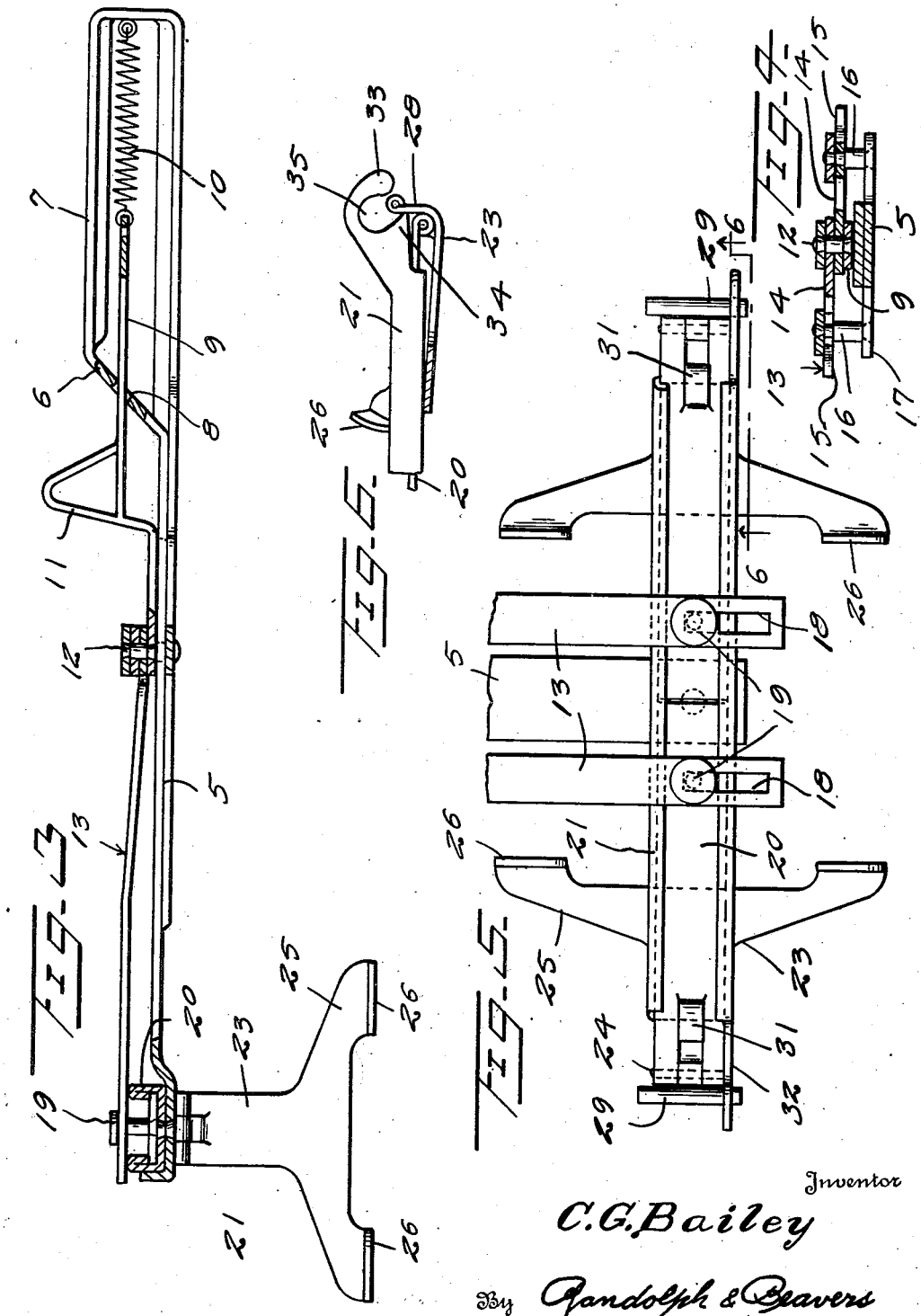
Inventor
C. G. Bailey
By Randolph & Beavers
Attorneys Patented Apr. 9, 1946

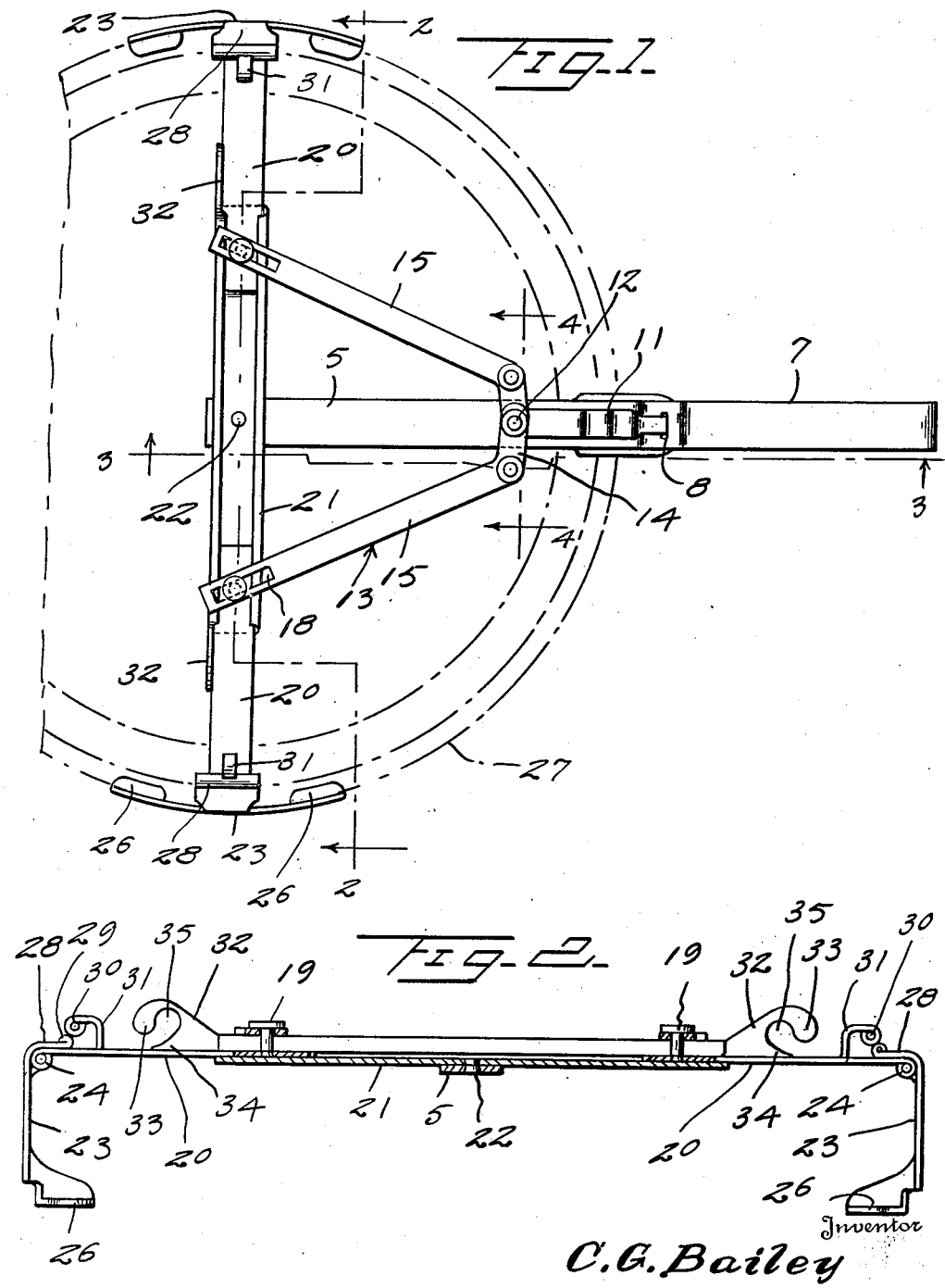

2,398,129

UNITED STATES PATENT OFFICE 2,398,129

PIEPAN LIFTER

Carl G. Bailey, Staunton, Va.

Application May 2, 1945, Serial No. 591,439

6 Claims. (Cl. 294—34)

The present invention relates to new and useful improvements in pie pan lifting devices embodying means for gripping the rim of a pie pan to facilitate handling thereof without necessitating the hands of a person coming into contact with the pan, thereby avoiding the danger of burning a person's fingers while handling hot pie pans.

More specifically the invention embodies an arm adapted for extending transversely across a pie pan and having gripping jaws pivotally mounted at the outer ends of the arm and extended therefrom for engaging under the rim of the pie pan together with actuating means for the jaws carried by a handle extending horizontally at right angles from the center of the arm to swing the jaws into and out of position at the underside of the arm to arrange the jaws in a compact form for convenient storage of the device, when not in use.

A further object of the invention is to provide means for locking the jaws in their vertically suspended position at the outer ends of the arm when in their working position.

Another object of the invention is to provide bell crank levers pivotally attached to the handle to provide a direct operative connection between the jaw actuating means and the slide carried by the handle for manipulating the jaws.

Another object of the invention is to provide a handle for the device composed of a single piece of strap metal holding upon itself to strengthen the handle and also to provide a guide for slidably supporting the actuating slide for the jaws.

Another object is to provide a device of this character of simple and practical construction, which is efficient and reliable in use, relatively inexpensive to manufacture, easy to manipulate and otherwise well adapted for the purpose for which the same is intended.

Other objects and advantages reside in the details of construction and operation as more fully hereinafter described and claimed reference being had to accompanying drawings forming part hereof, wherein like numerals refer to like parts throughout, and in which:

Figure 1 is a top plan view.

Figure 2 is a longitudinal sectional view through the arm taken substantially on a line 2—2 of Figure 1.

Figure 3 is a sectional view taken substantially on a line 3—3 of Figure 1.

Figure 4 is a transverse sectional view of the handle taken substantially on a line 4—4 of Figure 1.

Figure 5 is an enlarged fragmentary top plan view showing the jaws in folded position and Figure 6 is a fragmentary sectional view taken substantially on a line 6—6 of Figure 5.

Referring now to the drawings in detail wherein for the purpose of illustration I have disclosed a preferred embodiment of the invention the numeral 5 designates the handle of the pie pan lifter and which is constructed of a single piece of strap metal bent upon itself intermediate its ends to provide a double thickness of materials at the center of the handle as indicated in Figure 3 of the drawings.

The upper layer of material adjacent its folded portion, and which constitutes the outer end of the handle, is inclined upwardly as indicated at 6 to space the upper and lower layers of the materials from each other at the outer end of the handle, to provide an enlarged hand gripping area as indicated at 7. The double layers of the strap metal at the centrol portion of the handle are suitably secured in facing contact with each other in any suitable manner, such as by welding or the like.

The inclined portion 6 of the upper layer of the material is formed with an opening 8 in which a slide 9 is slidably mounted and with its rear end spaced between the upper and lower portions of the hand gripping section 7. A coil spring 10 connects the rear end of this slide 9 with the rear end of the handle to move the slide rearwardly.

The front portion of the slide is formed with an upwardly projecting thumb piece 11 and to the front end of the slide is attached a vertical pin 12.

A pair of bell crank levers designated generally at 13 include relatively short inner ends 14 and relatively long outer ends 15, the levers being pivoted at the junction of their short and long ends on vertical pins 16 rising from laterally projecting lugs 17 extending outwardly at opposite sides of the handle 5 in the region of the pin 12. The short ends 14 of the levers project laterally of the handle 12 toward each other and are pivoted at their ends on the pin 12.

The front ends of the long portions 15 of the levers are formed with longitudinally extending slots 18 in which vertical pins 19 are loosely positioned, the pins rising from the inner ends of slides 20 slidably mounted in a channel shaped arm 21 secured transversely on the front end of the handle 5 by means of a rivet or the like 22.

The slides 20 are adapted for sliding outwardly at the end of the arm 21 and jaws 23 are pivoted at the outer ends of the slide by means of hinge pins 24 for vertical raising and lowering movement of the lower end of the jaws into and out of position against the lower side of the slide.

The lower ends of the jaws 23 are formed with outwardly diverging fingers 25 terminating in horizontal flanges or shelves 26 adapted for engaging under the rim 27 of a pie pan so that the pie pan will be supported on said flanges when the jaws are disposed in a suspended position as shown in Figure 2 of the drawings.

The upper ends of the jaws 23 are bent inwardly to form a lip 28 adapted to lie upon the outer ends of the slides 20, the edge of the lip being rolled as indicated at 29 and adapted for movement to and out of position under the rolled edge 30 of a resilient tongue 31 struck upwardly from the slide 20 adjacent the outer end thereof, the tongue thus serving to releasably maintain the jaw 23 in its suspended position as indicated in Figure 2 of the drawings.

The jaws 23 are swung vertically into and out of position at the under sides of the slides 20 by means of substantially hook-like members 32 projecting upwardly at the ends of the arm 21 and including an upper overhanging bill portion 33 and a lower bill portion 34 spaced from the bill 33 to provide a notch 35 therebetween.

In the operation of the device the spring 10 will retract the slide 9 whereby to pull the pin 12 rearwardly to thus swing the short ends 14 of the bell crank levers 15 rearwardly and to swing the long ends 15 of the levers inwardly into a position substantially parallel to the handle 5 whereby to retract the slides 20 inwardly of the arm 21.

This inward movement of the slides 20 will cause the beading 29 of the lips 28 on the upper ends of the jaws 23 to engage the lower bill 34 of the hook member 32 whereby to raise the lip 28 upwardly into the notch 35 and to swing the lower ends of the jaws 23 upwardly against the bottom of the slides 20 into the position as shown in Figure 6 of the drawings. The jaws 23 are thus held in a folded position and in a substantially compact form for convenient storage purposes.

When it is desired to move the jaws 23 downwardly for engaging under the rim 27 of a pie pan, the thumb piece 11 of the slide 9 is forced forwardly whereby the bell crank levers 13 will swing outwardly at their front ends as indicated in Figure 1 of the drawings, thus moving the slides 20 laterally outwardly at the ends of the arm 21 and the upstanding end of the lips 28 upon engagement with the bill 33 of the hook member 32 will swing the jaws 23 downwardly so as to engage the beading 29 of the lips 28 under the rolled edge 30 of the resilient tongue 31 and thus secure the jaws in their downwardly suspended position as shown in Figure 2 of the drawings.

The jaws will be held in such position until they are engaged at the opposite sides of the pie pan and upon releasing the thumb piece 11 the spring 10 will then retract the slides 20 to move the jaws under the rib 27 of the pie pan into a position for lifting the pan.

It is believed that the details of construction, manner of operation and advantages of the device will be readily understood from the foregoing without further detailed explanation.

While I have herein shown and described a preferred embodiment of my invention, it will be understood that various changes may be made in the construction and arrangement of the parts and various modifications resorted to without departing from the spirit of the invention or the scope of the appended claims.

Having thus described the invention what I claim as new is:

1. A pie pan lifter comprising a pair of slides, a support for the slides adapted for extending transversely of a pie pan, a handle for the support, means carried by the handle for projecting, retracting the slides at the ends of the support, jaws pivotally mounted at the outer ends of the slides, and cooperating means between the jaws and the support for swinging the jaws vertically into and out of position against the under side of the slides.

2. A pie pan lifter comprising a pair of slides, a support for the slides adapted for extending transversely of a pie pan, a handle for the support means carried by the handle for projecting, retracting the slides at the ends of the support, jaws pivotally mounted at the outer ends of the slides, and adapted for engagement under the rim of a pie pan, an angularly projecting lip at the upper end of the jaws, and stationary means carried by the support in the path of the lip during projecting and retracting movement of the slides to swing the jaws vertically into and out of position against the under side of the slide.

3. A pie pan lifter comprising a pair of slides, a support for the slides adapted for extending transversely of a pie pan, a handle for the support means carried by the handle for projecting, retracting the slides at the ends of the support, jaws pivotally mounted at the outer ends of the slides, and adapted for engagement under the rim of a pie pan, an angularly projecting lip at the upper end of the paws, and hook-like members carried by the support and including upper and lower bills disposed in the path of the lips during projecting and retracting movement of the slides to swing the jaws vertically into and out of position against the under side of the slides.

4. A pie pan lifter comprising a pair of slides, a support for the slides adapted for extending transversely of a pie pan, a handle for the support means carried by the handle for projecting, retracting the slides at the ends of the support, jaws pivotally mounted at the outer ends of the slides, and adapted for engagement under the rim of a pie pan, an angularly projecting lip at the upper end of the jaws, and catches carried by the slides releasably engaging the lips to secure the jaws in a downwardly suspended open position, and hook-like members carried by the support and including upper and lower bills disposed in the path of the lips during projecting and retracting movement of the slides to swing the jaws vertically into and out of open position.

5. A pie pan lifter comprising a pair of slides, a support for the slides adapted for extending transversely of a pie pan, a handle for the support, jaws pivotally mounted at the outer ends of the slides for vertical swinging movement, cooperating means between the jaws and the support for swinging the jaws into and out of position against the under side of the slides, bell crank levers pivoted to the handle and pivotally and slidably attached at one end to the inner ends of the slides, a manually operable slide carried by the handle and pivoted to the other ends of the levers, a thumb piece rising from said last named slide for moving the latter in one direction, and spring means connected to said last named slide for moving the same in an opposite direction.

6. A pie pan lifter comprising a pair of slides, a support for the slides adapted for extending transversely of a pie pan, a handle for the support, and formed of a single piece of strap metal bent upon itself to provide double layers of material secured to each other at an intermediate portion of the handle, said double layers of material being spaced from each other adjacent the bent end of the handle to provide a hand grip of increased cross-sectional area, jaws pivotally mounted at the outer ends of the slides for vertical swinging movement, cooperating means between the jaws and the support for swinging the jaws into and out of position against the under side of the slides, bell crank levers pivoted to the handle and pivotally and slidably attached at one end to the inner ends of the slides, a manually operable slide within the hand grip of the handle and having one end projecting therefrom and pivoted to the other ends of the levers, a thumb piece rising from said one end of the last named slide for moving the latter in one direction, and spring means connecting the other end of the last named slide to the handle for moving the former in an opposite direction.

CARL G. BAILEY.